United States Patent Office 2,907,759
Patented Oct. 6, 1959

2,907,759

6-OXYGENATED 16α,17α-OXIDO-PREGN-4-EN-3,20-DIONES AND DERIVATIVES

Leland J. Chinn, Morton Grove, Ill., assignor to G. D. Searle & Co., Chicago, Ill., a corporation of Delaware No Drawing. Application November 21, 1958
Serial No. 775,391

8 Claims. (Cl. 260—239.55)

The present invention relates to 6-oxygenated 16α,17α-oxido-pregn-4-en-3,20-diones which may be represented by the structural formula

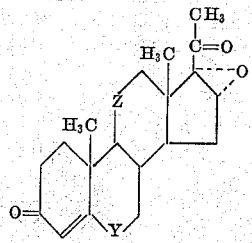

wherein Y is selected from the group consisting of carbonyl, hydroxymethylene, and lower - (alkanoyloxy)methylene radicals and Z is selected from the group consisting of methylene and carbonyl radicals. Lower-alkanoyloxy radicals which may be used are the acyloxy radicals of carboxylic acids such as formoxy, acetoxy, propionoxy, butyroxy, isobutyroxy, valeryloxy, isovaleryloxy, hexanoyloxy, heptanoyloxy, and octanoyloxy.

The 16α,17α-oxido-pregn-4-en-6β-ol-3,20-diones of the present invention are prepared by treating the appropriate 16α,17α-oxido-pregn-4-en-3,20-dione first with ethyl orthoformate to form the 3-enol-ethyl ether then with alkaline hydrogen peroxide and isolating the product. The 6β-ols thus obtained can be treated with an oxidizing agent to yield the 6-oxo compounds of the present invention. Treatment of the 6β-ols with an acid anhydride and isolation of the product affords the 6β-alkanoyloxy derivatives of the present invention.

Another compound of this invention, namely 16α,17α-oxido-5α-pregnane-3,6,20-trione, is obtained by treating 16α,17α-oxido-pregn-4-en-6β-ol-3,20-dione with an aqueous solution of potassium hydroxide in methanol and isolating the product.

Examples of suitable starting materials which may be used for preparation of the compounds of this invention are 16α,17α-oxido-pregn-4-en-3,20-dione and 16α,17α-oxido-pregn-4-en-3,11,20-trione.

As a specific example, treating 16α,17α-oxido-pregn-4-en-3,20-dione first with ethyl orthoformate in the presence of a catalytic amount of p-toluenesulfonic acid, then with alkaline hydrogen peroxide and isolating the product affords 16α,17α - oxido-pregn - 4 - en - 6β - ol - 3,20-dione. Treating the latter with chromic acid and isolating the product yields 16α,17α-oxido-pregn-4-en-3,6,20-trione, while treatment of the 6β-ol with acetic anhydride in the presence of pyridine and isolation of the product gives 6β-acetoxy-16α,17α-oxido-pregn-4-en-3,20-dione.

The compounds of the present invention have valuable pharmacological properties. They exhibit selective hormonal and anti-hormonal properties, being, for example, effective in inhibiting the sodium retention caused by desoxycorticosterone and its esters. They also exhibit estrogenic and progestational activity.

The invention will appear more fully from the examples which follow. These examples are set forth by way of illustration only and it will be understood that the invention is not to be construed as limited in spirit or in scope by the details contained therein as many modifications in materials and methods will be apparent in the disclosure to those skilled in the art. In these examples temperatures are given in degrees centigrade (° C.). Quantities of materials are expressed in parts by weight and in parts by volume which bear the same relation one to the other as kilograms to liters.

EXAMPLE 1

*16α,17α-oxido-pregn-4-en-6β-ol-3,20-dione*

To a chilled solution of 2 parts by weight of 16α,17α-oxido-pregn-4-en-3,20-dione in 10 parts by volume of dioxane are added successively 2 parts by volume of ethyl orthoformate, 0.6 part by volume of a 10% solution of p-toluenesulfonic acid in dioxane, and 0.1 part by volume of ethanol. The mixture is allowed to stand at room temperature for 2 hours, then chilled and a solution of 0.2 part by weight of sodium hydroxide in 0.25 part by volume of water and 6 parts by volume of 30% hydrogen peroxide added. The mixture is allowed to stand at room temperature for 6 days after which the solid which precipitates is collected, washed with water, and recrystallized from an acetone-methanol solution to yield 16α,17α-oxido-pregn-4-en-6β-ol-3,20-dione, M.P. 272–276°. It exhibits a maximum in the ultra-violet at 235.5 millimicrons with an extinction coefficient of 14,350.

EXAMPLE 2

*16α,17α-oxido-pregn-4-en-3,6,20-trione*

To a suspension of 1.1 parts by weight of 16α,17α-oxido-pregn-4-en-6β-ol-3,20-dione in 25 parts by volume of acetic acid is added a solution of 0.3 part by weight of chromium trioxide in 15 parts by volume of acetic acid and 1 part by volume of water. The mixture is stirred at room temperature for 3 hours after which it is diluted with methanol to destroy excess chromium trioxide and evaporated to dryness in vacuo. The residue is washed with water and recrystallized from ether-petroleum ether solution to yield 16α,17α-oxido-pregn-4-en-3,6,20-trione, M.P. 205–208.5°. It exhibits a maximum in the ultra-violet at 250 millimicrons with an extinction coefficient of 10,500. In the infra-red it exhibits maxima at 5.90, 5.95 and 6.27 microns.

EXAMPLE 3

*6β-acetoxy-16α,17α-oxido-pregn-4-en-3,20-dione*

A solution of 5 parts by weight of 16α,17α-oxido-pregn-4-en-6β-ol-3,20-dione in 50 parts by volume of pyridine and 50 parts by volume of acetic anhydride is allowed to stand at room temperature for 16 hours. The oily precipitate which separates when the reaction mixture is poured into ice water is washed with water and crystallized from an ether-petroleum ether solution to yield 6β - acetoxy - 16α,17α-oxido-pregn-4-en-3,20-dione, M.P. 161.5–162.5°. [α]$_D$=+73.6° (1.08% in dioxane). It exhibits a maximum in the ultra-violet at 235 millimicrons with an extinction coefficient of 13,350. In the infra-red it exhibits maxima at 5.76, 5.90, 5.98, 6.18 and 8.02 microns.

By substituting an equivalent quantity of hexanoic anhydride and otherwise proceeding according to the herein described processes 6β-hexanoyloxy-16α,17α-oxido-pregn-4-en-3,20-dione is obtained.

EXAMPLE 4

*16α,17α-oxido-pregn-4-en-6β-ol-3,11,20-trione*

To a suspension of 5.6 parts by weight of 16α,17α-oxido-pregn-4-en-3,11,20-trione in 20 parts by volume of dioxane are added successively 6 parts by volume of ethyl orthoformate, 1.8 parts by volume of a 10% solution of p-toluenesulfonic acid in dioxane, and 0.3 part by volume of ethanol. The mixture is stirred at room temperature for 2¾ hours then chilled and 0.66 part by weight of sodium hydroxide in 0.5 part by volume of water and 18 parts by volume of 30% hydrogen peroxide added. The mixture is allowed to stand at room temperature for 7 days. The precipitate which forms is collected, washed with water, and chromatographed on silica gel, using 30% ethyl acetate in benzene as the eluant, to yield 16α,17α-oxido-pregn-4-en-6β-ol-3,11,20-trione which after recrystallization from acetone has a M.P. of 276–281°. $[\alpha]_D = +155°$ (0.94% in chloroform). It exhibits a maximum in the ultra-violet at 231.5 millimicrons with an extinction coefficient of 13,030.

EXAMPLE 5

16α,17α-oxido-pregn-4-en-3,6,11,20-tetraone

To a stirred solution of 2.7 parts by weight of 16α,17α-oxido-pregn-4-en-6β-ol-3,11,20-trione in 8 parts by volume of acetic acid is added portionwise a solution of 1 part by weight of chromium trioxide in 5 parts by volume of water and 50 parts by volume of acetic acid. The mixture is stirred at room temperature for 3 hours, then treated with methanol to destroy unreacted chromium trioxide and poured into ice water. The resulting mixture is extracted with chloroform, the extract washed with saturated sodium bicarbonate solution and evaporated to dryness in vacuo. Trituration of the residue with ether followed by crystallization from ether yields 16α,17α-oxido-pregn-4-en-3,6,11,20-tetraone, M.P. 206–210°. It exhibits a maximum in the ultra-violet at 245–246 millimicrons with an extinction coefficient of 11,130. Its infra-red spectrum has maxima at 5.90, 5.95 and 6.26 microns.

EXAMPLE 6

6β-acetoxy-16α,17α-oxido-pregn-4-en-3,11,20-trione

A solution of 1.91 parts by weight of 16α,17α-oxido-pregn-4-en-6β-ol-3,11,20-trione in 30 parts by volume of acetic anhydride and 30 parts by volume of pyridine is allowed to stand at room temperature for 15 hours. Dilution with a large volume of water results in formation of a crystalline product which is collected by filtration and washed well with water. Recrystallization from ether affords 6β-acetoxy-16α,17α-oxido-pregn-4-en-3,11,20-trione, M.P. 227–229°. $[\alpha]_D = +148.5°$ (1% in chloroform). It exhibits a maximum in the ultra-violet at 230–231 millimicrons with an extinction coefficient of 13,430. Its infra-red spectrum has maxima at 5.80, 5.88, 5.90, 5.95, 6.18 and 8.05 microns.

By substituting an equivalent quantity of isobutyric anhydride and otherwise proceeding according to the herein described processes 6β-isobutyroxy-16α,17α-oxido-pregn-4-en-3,11,20-trione is obtained.

EXAMPLE 7

16α,17α-oxido-5α-pregnane-3,6,20-trione

A solution of 2 parts by weight of 16α,17α-oxido-pregn-4-en-6β-ol-3,20-dione in 160 parts by volume of water and 160 parts by volume of methanol containing 0.5 part by weight of potassium hydroxide is refluxed for 1½ hours. The mixture is cooled, saturated with sodium chloride, and extracted with chloroform. The chloroform solution is washed with saturated sodium chloride solution, dried over anhydrous sodium sulfate, and evaporated to dryness in vacuo. Recrystallization of the residue from an acetone-methanol solution affords 16α,17α-oxido-5α-pregnane-3,6,20-trione, M.P. 242–248.5°.

What is claimed is:

1. A compound of the structural formula

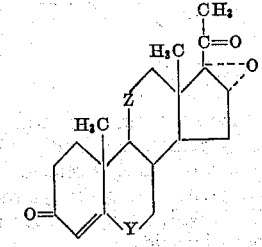

wherein Y is selected from the group consisting of carbonyl, hydroxymethylene, and lower-(alkanoyloxy)-methylene radicals and Z is selected from the group consisting of methylene and carbonyl radicals.

2. 16α,17α-oxido-pregn-4-en-6β-ol-3,20-dione.
3. 16α,17α-oxido-pregn-4-en-3,6,20-trione.
4. 6β-acetoxy-16α,17α-oxido-pregn-4-en-3,20-dione.
5. 16α,17α-oxido-pregn-4-en-6β-ol-3,11,20-trione.
6. 16α,17α-oxido-pregn-4-en-3,6,11,20-tetraone.
7. 6β-acetoxy-16α,17α-oxido-pregn-4-en-3,11,20-trione.
8. 16α,17α-oxido-5α-pregnane-3,6,20-trione.

No references cited